Jan. 6, 1931.    H. D. CHURCH    1,788,083
UNIVERSAL JOINT
Filed March 1, 1926
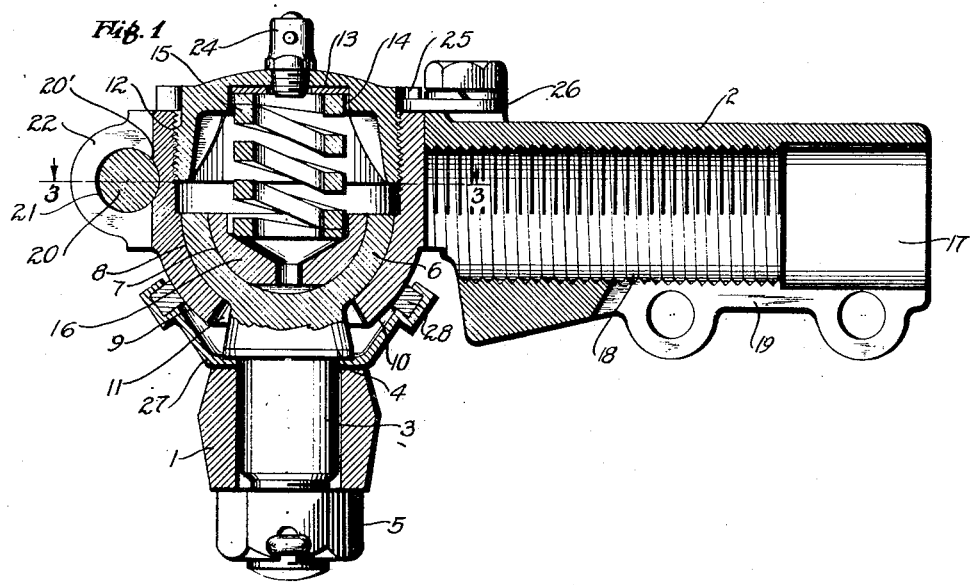
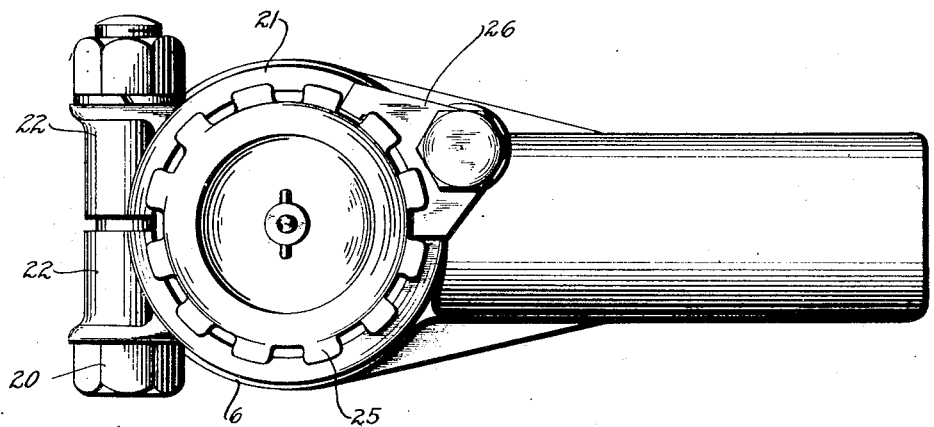
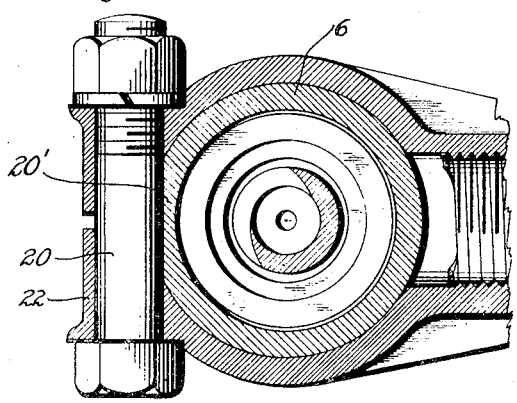
INVENTOR
HAROLD D. CHURCH
BY Richey & Watts
ATTORNEYS Patented Jan. 6, 1931

1,788,083

UNITED STATES PATENT OFFICE

HAROLD D. CHURCH, OF CLEVELAND HEIGHTS, OHIO, ASSIGNOR TO THE WHITE MOTOR COMPANY, OF CLEVELAND, OHIO, A CORPORATION OF OHIO

UNIVERSAL JOINT

Application filed March 1, 1926. Serial No. 91,351.

This invention relates to universal joints and particularly to such joints as are used to connect the parts of the steering mechanism of automobiles.

An object of this invention is to provide a universal joint which may be effectively protected against dirt and other abrasive substances.

Another object is to provide a universal joint which may be readily and economically manufactured.

Other objects will hereinafter appear.

The invention will be more readily understood from a description of one practical embodiment thereof, illustrated in the accompanying drawings, in which, Fig. 1 is a vertical longitudinal section of a universal joint for connecting the drag link or cross bar to the steering arm in an automobile steering mechanism.

Fig. 2 is a plan view of the joint illustrated in Fig. 1.

Fig. 3 is a horizontal sectional view taken on the line 3—3 of Fig. 1.

The apertured end or hub of a steering arm is illustrated at 1, and a member is shown at 2 having a threaded tubular shank in which the end of the drag link is secured.

The joint consists of a pin carried by the arm 1 and a socket carried by the shank 2. This pin consists of a shank 3 which is fitted into the aperture in the end of the arm, and has a shoulder 4 at the upper side thereof, the arm being clamped between this shoulder and a nut 5 threaded on the end of the shank.

Above the shoulder, the pivot member is provided with a head 6 which has concentric inner and outer segmental spherical surfaces 7 and 8, the extent of these surfaces being shown as substantially a hemisphere.

The head extends into a socket 9 which has an inner segmental spherical surface complementary to the outer surface 7 of the head and an outer segmental spherical surface 10 concentric thereto. The lower end of the socket is apertured at 11 to accommodate the shank of the pivot member. Above the spherical surfaces, the socket extends upwardly and is provided at 12 with an internal thread. A cap 13 is provided with a downwardly depending flange threaded to engage the thread of the socket and with a recess 14 to receive one end of a strong spiral spring 15.

The lower end of the spring 15 is received in a recess in a segmental sepherical shoe 16 which bears upon the concave surface of the pivot member head as shown, and thus maintains the spherical bearing surfaces in contact.

The member 2 consists of a tubular shank 17 internally threaded at 18 to engage corresponding threads on the rod to which it is joined. The lower part of this shank is split as indicated at 19 and is provided with perforated lugs to receive bolts which clamp the shank tightly upon the rod.

One end of the shank is formed into a split ring 21 which is provided adjacent the split with bosses 22 which are perforated to receive a bolt 20. This split ring embraces the socket and is tightly clamped thereto by the bolt. The bolt also engages a groove in the socket at 20' and so prevents any longitudinal or angular movement thereof.

The cap 13 is provided with a notched or serrated flange 25, the serrations of which are engaged by a pawl 26 bolted upon member 2 as shown. The cup is also provided with a valve 24 through which lubricant may be supplied to the interior.

A cup shaped sleeve 27 is clamped between the shoulder 4 and the arm 1. The sleeve extends upwardly and outwardly to a point adjacent the spherical surface 10 and at its ends is bent to provide a circumferential recess for receiving a felt ring 28 which bears upon the surface 10, forming a seal to retain any lubricant that may escape past surface 7 to within the sleeve, and preventing dust and dirt from reaching the interior of the joint.

Due to the large diameter of the top of the head of the pivot member and its being entirely exposed to the lubricant reservoir within the socket, a relatively large amount of lubricant is supplied to the bearing surfaces 7 as well as to bearing surfaces 8, so that they are always well lubricated and wear thereon is very slight.

By making the head of the pivot hollow, the height of the joint is greatly reduced, as the shoe and most of the spring are located below what would be the top of the pivot member if its head were a complete sphere. This reduction in height renders the joint very compact, and makes it possible to produce a neat and attractive joint having very little overhang.

The angular extent of the several spherical surfaces is relatively small, so that these may be much more readily machined than would be the case for a complete ball.

The socket, which is the part most subject to wear, is of convenient size, has no projections and can therefore be readily and economically produced. When worn, the socket can be readily replaced by merely removing bolt 20 and sliding the socket out of the split ring, and then removing the pivot member, shoe and spring. It being unnecessary to remove member 2 from its rod, the adjustment of the steering mechanism is not disturbed.

The pivot member, socket, shoe, spring and cap are a bench assembly and may be readily replaced as a unit in substantially the same manner as the socket alone.

Moreover, it will be readily seen that the parts are simple, requiring few manufacturing operations thereon, of sturdy construction, and readily assembled.

While I have illustrated and described what is now the preferred embodiment of my invention, it will be obvious that many variations and modifications thereof will readily occur to those skilled in the art to which it appertains, and I therefore do not limit myself to the precise details of the embodiment shown but to claim as my invention all such various modifications that come within the scope of the subjoined claims.

I claim:

1. A universal joint assembly comprising a cylindrical socket, a closure for one end thereof, the other end of the socket being provided with a segmental spherical surface surrounding an aperture, a pivot member having a hollow semi-spherical head bearing upon said segmental surface of the socket, and a shank extending through the aperture, a spherical segmental shoe engaging the inner surface of said head, a spring between said shoe and said closure, said shoe and said head being spaced from said closure to provide a substantially closed lubricant reservoir.

2. A universal joint assembly comprising a cylindrical socket, a closure for one end thereof, the other end of the socket being provided with a segmental spherical surface surrounding an aperture, a pivot member having a hollow segmental spherical head bearing upon said segmental surface of the socket, and a shank extending through the aperture, a spherical segmental shoe engaging the inner surface of said head, a spring between said shoe and said closure, said shoe and said head being spaced from said closure to form a lubricant reservoir.

3. A universal joint comprising a pivot member having a convex lower and a concave upper segmental imperforate surface, a socket having a concave segmental surface bearing on the convex surface of said pivot member, a convex segmental shoe engaging the concave surface of said pivot member, a spring interposed between said socket and said shoe, and a central perforation through said shoe.

4. A universal joint comprising a cylindrical socket, a closure for one end thereof, the other end being defined with a concave spherical segmental surface surrounding an aperture, a pivot member having a hollow segmental spherical head bearing on said surface of the socket and a shank extending through the aperture, a spherical perforated segmental shoe engaging the inner surface of the head and a spring between said shoe and said closure, said shoe and head being spaced from said closure to provide a lubricant reservoir.

5. A universal joint comprising a hollow socket constituting a lubricant reservoir, a centrally apertured concave spherical bearing surface at one end thereof, a pivot member in said end including means closing said aperture, said pivot member including an outer convex spherical segmental bearing surface complementary to said first named surface and an inner concave bearing surface concentric with said outer surface, a segmental convex spherical shoe within and complementary to said inner surface, a lubricant passage through said shoe and a recess on the bottom of said shoe, said passage and said recess communicating with the inner surface of said pivot member, said inner surface being adapted to direct lubricant flow from said passage radially outward and to return lubricant to said reservoir.

6. A universal joint comprising a hollow socket constituting a lubricant reservoir, a centrally apertured concave spherical segmental bearing surface at one end thereof, a pivot member in said end and including an outer convex spherical segmental bearing surface complementary to said first named surface and an inner concave bearing surface concentric with said outer surface, a segmental convex spherical shoe within and complementary to said inner surface, means carried by said pivot member closing said socket to retain lubricant therein, the bearing surfaces between said pivot member and said shoe opening directly into said lubricant reservoir.

7. In a joint for a member arranged to transmit thrust axially thereof and having a socket secured thereto, said socket having an annular spherical wall surrounding an aperture opening therethrough substantially at right angles to the axis of said member, and a second member having a shank extending through said aperture, a head on said shank disposed within said socket, said head having an external spherical surface complemental to the spherical surface of said socket and an internal spherical surface concentric therewith, a shoe having a spherical surface engaging the internal spherical surface of said head, and a spring disposed between said shoe and said socket.

8. A universal joint comprising a socket having a concave annular wall surrounding an aperture, a pivot member including a shank extending through said aperture and a convex head bearing against said annular wall, a shoe engaging said head and a spring disposed between said shoe and a wall of said socket and urging said shoe against said head, said shoe being spaced in all directions from said socket whereby said shoe and said head may oscillate as a unit in all directions with respect to said socket.

In testimony whereof I hereunto affix my signature this 17th day of February, 1926.

HAROLD D. CHURCH.